INVENTOR
SALIMUZZAMAN SIDDIQUI

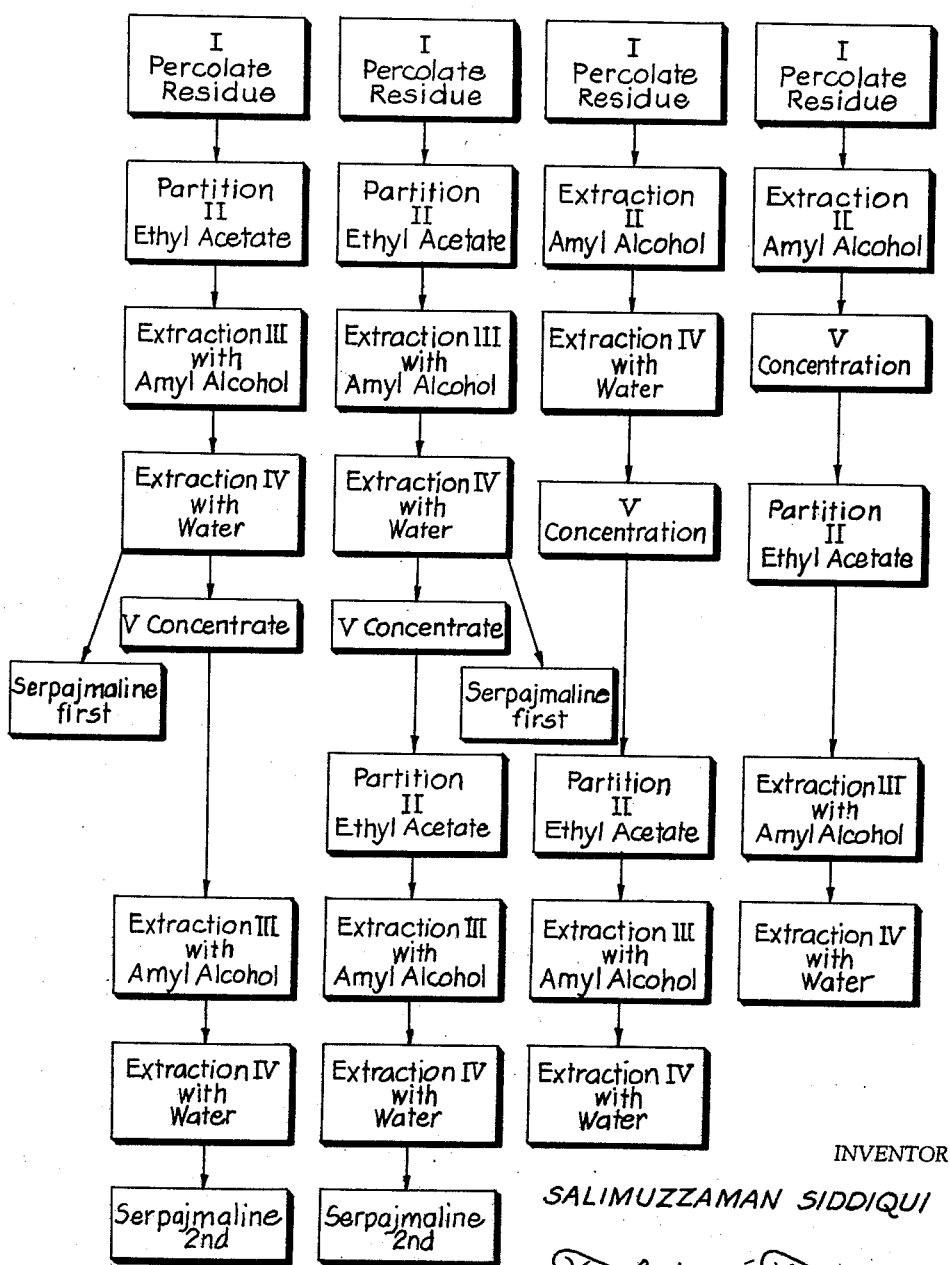

BY Toulmin & Toulmin
ATTORNEYS

3,047,562
RAUWOLFIA ALKALOIDAL COMPLEXES AND PROCESS FOR ISOLATING THE SAME FROM RAUWOLFIA PLANT MATERIAL
Salimuzzaman Siddiqui, % Pakistan Council of Scientific and Industrial Research, Karachi, Pakistan
Filed Sept. 3, 1958, Ser. No. 758,713
14 Claims. (Cl. 260—236)

This invention relates to a new hypotensively active, substantially non-sedative and non-depressant Rauwolfia alkaloidal complex and to a process for isolating the same from Rauwolfia plant materials.

S. Siddiqui and R. H. Siddiqui for the first time isolated a series of crystalline bases from the roots of *Rauwolfia serpentina*, Benth. [cf. J. Indian Chem. Soc., 8, 667 et seq. (1931)]. These bases, which were named as ajmaline, ajmalinine, ajmalicine, serpentine and serpentinine, were separated from the total alkaloids obtained from dried, ground Rauwolfia roots principally on the basis of differences in their basic strength on the one hand, and of solubilities of their hydrochlorides on the other.

In the known processes described in the aforesaid publication for isolating chiefly crystalline alkaloidal substances from dried plant material of Rauwolfia species such as *Rauwolfia serpentina*, Benth., the dried and powdered root material is percolated several times with alcohol, and the latter is then distilled off from the combined percolates under reduced pressure below 50° C., till a thick greenish brown liquid is left behind. On complete removal of the solvent a semi-solid bitter extract is obtained. The crude extract is shaken out repeatedly with petroleum ether and then carefully concentrated further in vacuo till nearly all the solvent is removed. The light brown semi-solid extract is first treated with ammonia and then with caustic soda and extracted each time to exhaustion with ether containing a little alcohol. The alcoholic extract of the roots is thus subdivided into four fractions, the two middle, ethereal fractions constituting chiefly the alkaloidal factors while the petroleum ether fraction and the final residue contain the non-alkaloidal factors.

The two ethereal solutions obtained on exhaustively extracting the semi-solid alcoholic extract after treatment with ammonia and then with alkali were worked up for the separation of various alkaloids, as described.

Later, in 1939, S. Siddiqui further reported the isolation of a weakly basic crystalline alkaloid from the neutral fraction of the alcoholic extract of the roots melting at 234° C. [cf. J. Indian Chem. Soc., 16, 421 (1939)]. In 1952 Schlittler et al. reported the isolation of reserpine, also from the acid-insoluble neutral fraction of the alcoholic extracts of the roots [cf. Experent. 8, 338 (1952)], and in the following years a number of other bases from the roots of *Rauwolfia serpentina* were isolated. All these various isolation processes such as described, for instance, by Schlittler et al. [Helv. Chim. Acta, vol. 37, pp. 1912–20 (1954)] and by Klohs et al. [Journ. Am. Chem. Soc. vol. 76, pp. 1332–4 (1954)] use the above outlined basic process of S. Siddiqui and R. H. Siddiqui and lead to the production of individual alkaloids by extraction in which the natural conditions of alcoholic Rauwolfia concentrates are changed to pH values either in the acidic or the alkaline range as may be required to achieve the isolation of the various individual alkaloids.

It must be borne in mind that the isolation of the individual alkaloids would necessarily lead to the destruction of larger complexes, in which the individual alkaloids are presumably structural elements, bonded together by co-ordinative links.

The resolution of these complexes must necessarily have a great influence on the pharmacological action of the resulting products.

In this connection it may be mentioned that on the pharmacological side Chopra et al. showed the blood pressure reducing properties of the total Rauwolfia alkaloids [cf. Indian J. Med. Res., 21, 261 (1933)] but reserpine and later rescinnamine were noted to have the strongest hypotensive action among the pure crystalline alkaloids [cf. Muller, Schlittler and Bein, Experent, 8, 338 (1952); Bein, ibid, 9, 107 (1953)]. Besides the hypotensive action, however, reserpine possesses a central depressant action resulting in sedation and causing psychosis. Recently on the clinical side paranoia states with suicidal tendencies have been observed [cf. Schroeder et al., J. Am. Med. Assn., 159, 839 (1955)]. These central secondary effects have greatly limited the use of reserpine and corresponding Rauwolfia extracts; as a result, the known Rauwolfia preparations can no longer be considered to be the ideal blood pressure reducing agents, as was thought after the earlier experiments.

It is therefore an object of my invention to provide a Rauwolfia alkaloidal complex which has a fully satisfactory hypotensive activity while being substantially and preferably completely free from sedative and depressant action.

It is a further object of my invention to provide a process for producing the aforesaid Rauwolfia alkaloidal complex in a new and simple manner, in which a group of alkaloids and associated substances occurring in Rauwolfia plants are isolated as a complex under substantial preservation of the chemical interrelationship between the substances constituting the complex, in its native state of occurrence.

These objects are achieved by my present invention which is based on my discovery that by an altogether fresh approach to the handling of plant material from the Rauwolfia species of plants such as *Rauwolfia serpentina*, Benth., for the isolation of their constituents, and in particular by avoiding the unkindly and drastic treatment of such materials in the past, which involved exposure to fungal and oxidative action in the process of drying, as well as the free use of acidic and basic agents in the extraction and isolation procedures, it is possible to obtain a Rauwolfia alkaloidal complex substantially undegenerated, which has a high hypotensive activity, but is free from the undesirable sedative and depressant action of reserpine and Rauwolfia preparations containing this alkaloid. Another advantage of this process is that the complex bearing the hypotensive activity in spite of the total absence of reserpine in it, is obtained in a yield of 1% as against ca. 0.1% noted for reserpine, on the basis of air dried roots.

The process according to my invention therefore comprises a plurality of steps destined to separate the exclusively hypotensive factor from the hypotensive-cum-sedative factor of Rauwolfia, which steps comprise the following groups or stages:

(I) The steps of percolating the roots with ethanol or methanol and removing the solvent from the percolate;

(II) Partitioning the semi-solid residue between water and ethyl acetate or an organic solvent not miscible with water and having a similar range of solvent action;

(III) Extracting the aqueous phase resulting from either stage (II) or from a partition of the aforesaid residue from (I) with a hydroxylic, partially water-miscible organic solvent, preferably amyl alcohol, with that latter alcohol, (IV) And extracting the combined amyl alcohol phase from (III) with water, whereby an alkaloidal complex named "serpajmaline" is obtained from the aqueous extract on removal of the solvent.

These steps are illustrated in the accompanying flow sheets in which:

FIGURE 1 illustrates a first mode (A) of operation of the process according to the invention;

FIGURE 1A illustrates mode (A) of carrying out the process according to the invention but with a repetition of the first part of the process;

FIGURE 2 is a flow sheet illustrating another mode (B) of carrying out the process of the invention;

FIGURE 3 shows yet another mode (C) of carrying out the process according to the invention in practice;

Figure 4:
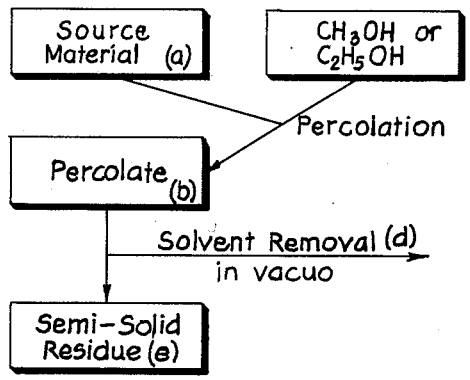
FIGURE 4 illustrates the initial stage (I) of all modes of carrying out the process according to the invention in practice.

The first stage (I) in the process according to the invention as illustrated in FIGURE 4 is directed to the production of a starting alcoholic extract of Rauwolfia. This extract is substantially obtained as described by S. Siddiqui and R. H. Siddiqui in 1931 supra by the percolation ($b$) of disintegrated Rauwolfia plant material ($a$) with a short chain aliphatic alcohol ($c$), preferably methanol or ethanol, removal ($d$) of the alcohol solvent from the percolate by distilling the latter off, preferably under reduced pressure below 50° C. so that a thickened greenish brown highly viscous liquid or semi-solid residue remains as the starting extract ($e$).

However, while S. Siddiqui and R. H. Siddiqui used dry powdered root for this extraction step, I now prefer to use as source material the fresh undried roots chopped into small lengths and fresh undried scraped root bark of Rauwolfia species of plants more especially of *Rauwolfia serpentina*, Benth. Freshly collected roots or root bark dried around 60° C. in a current of air or preferably in an inert gas like nitrogen and carbon dioxide, and dried powdered roots or root bark are also employed as source material.

The great advantage in working with the fresh plant material in the suggested manner lies in the fact that the cell membranes of the fresh roots act in effect as a dialyzing medium and retain a substantial portion of the non-alkaloidal ballast, and the dialyzate thus yields on removal of the solvent only about 5% of semi-solid matter on air dried basis as against 10 to 12% extractive from the alcoholic percolates of the dried powdered roots, the non-alkaloidal ballast which greatly complicates the isolation work being thus reduced by about half.

Figure 5:
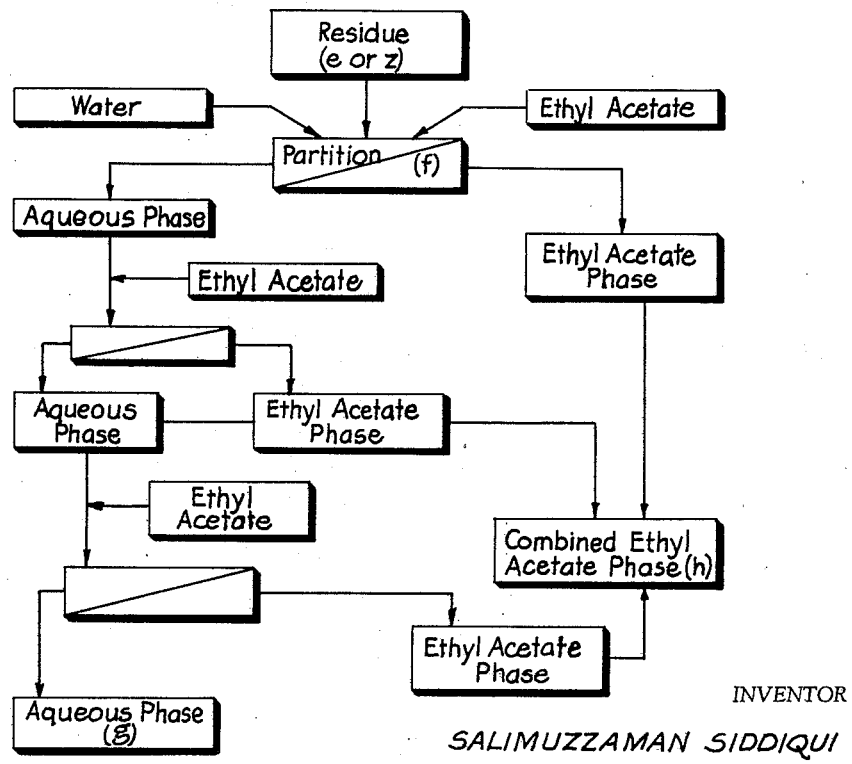
FIGURE 5 illustrates a stage (II) comprising a partition between water and a substantially neutral solvent of the kind described in detail hereinafter.

In a stage (II) as illustrated in FIGURE 5, which stage is the second step in mode (A) and the second and sixth step in mode (A') (FIGURE 2) and the fifth step in mode (B) as well as the fourth and eighth step in mode (C) of carrying out the inventive process, the semi-solid extract (I-$e$) is partitioned ($f$) between water and a substantially neutral organic solvent which is immiscible therewith, in particular with ethyl acetate.

The temperature to be observed during all operations where not otherwise indicated is room temperature ($c$).

The removal of solvents is carried out preferably in vacuo, but always below 60° C.

The separation steps used in this stage and in the further stages to be described hereinafter may be effected by filtration, centrifugation, decantation or similar separating steps known in the chemical art.

Throughout this stage (II) as well as all other stages in the process according to the invention, the pH values remain uncontrolled, so that the natural mode of occurrence of the various constituents in the alkaloidal complexes is left undisturbed as much as possible. This is an important feature of the process according to my invention by which it is distinguished from the processes proposed in the art for isolating the individual alkaloids.

The use of ethyl acetate in this stage (II) is preferred, because it offers a number of advantages over the other neutral organic solvents having a similar range of solvent action.

Thus, use of the other above-mentioned solvents, although possible, either makes the separation of the aqueous and organic solvent layers more complicated, due to a greater tendency of the non-aqueous solvent to form an emulsion with water, or the solvent may show a tendency to resinify some of the alkaloids after prolonged contact therewith, which is the case with chloroform. If the latter is used, a more cumbersome removal of the solvent is indicated.

In FIGURE 5, the partition step has been illustrated as repeated twice ($a_2$ and $a_3$), while, of course it may not be repeated or repeated less or more often, depending on the amounts and concentrations involved.

Figure 6:
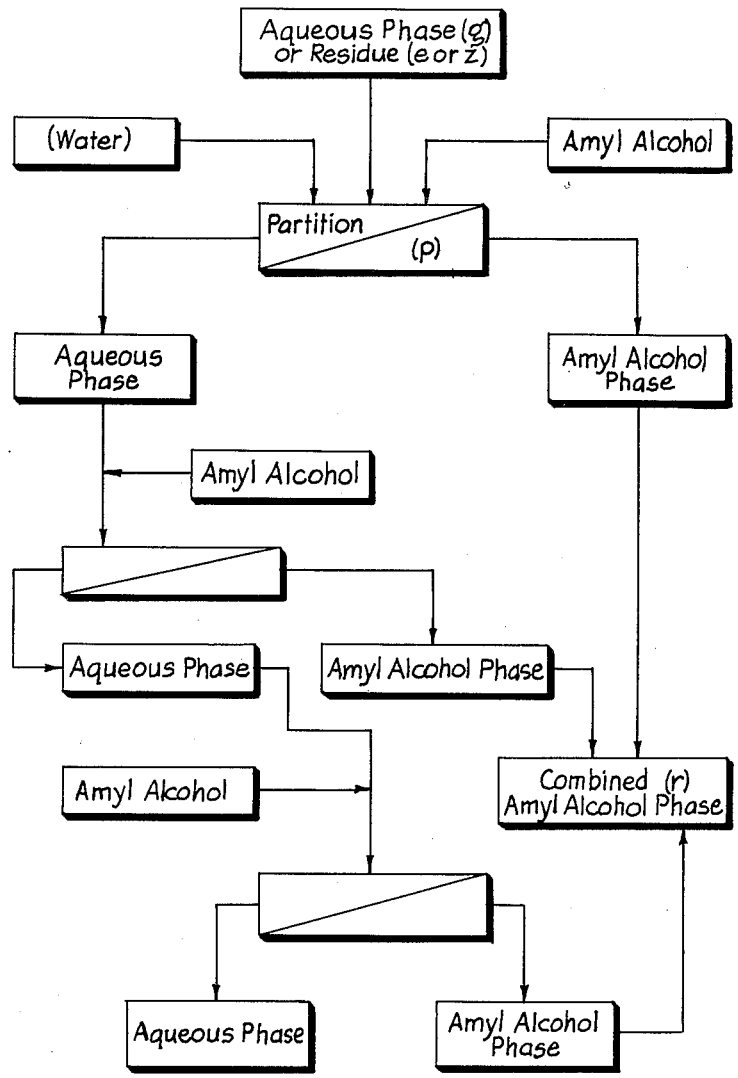
FIGURE 6 illustrates a stage (III) of the process according to the invention comprising a partition between water and a monohydroxylic alcohol and the formation of a combined alcoholic extract.

In FIGURE 6, the stage designated by (III) comprises a partition ($p$) of the initial extract introduced into this stage, between water and a monohydroxylic alcohol having 4 to 6 carbon atoms, and preferably between water and n-amyl alcohol. If, as is shown in FIGURE 6, this treatment is repeated several times, the resulting amyl alcohol phases are combined ($r$) and serve as the starting material for stage (IV).

Figure 7:
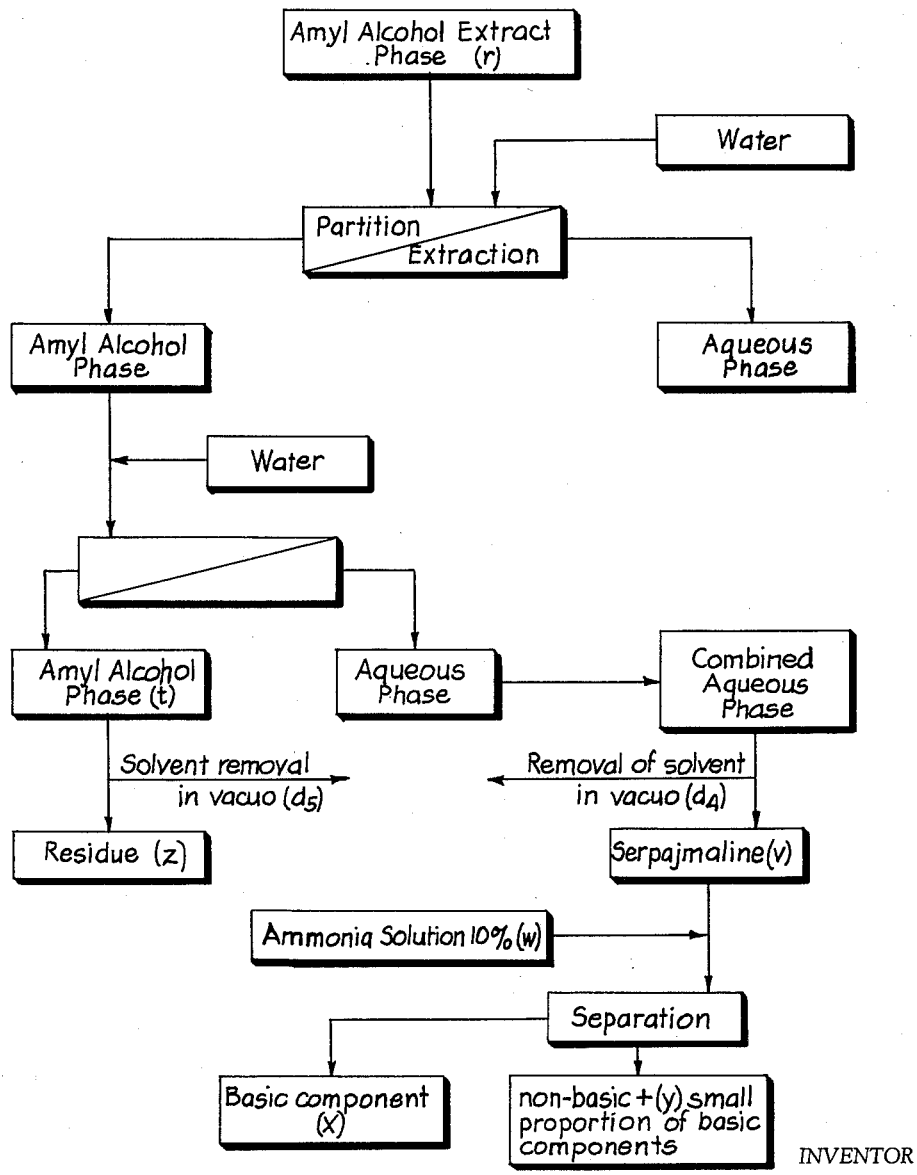
FIGURE 7 illustrates two steps of which the first (IV) is similar to that of FIGURE 6 but leading to the formation of a combined aqueous phase, while step (V) may follow step (IV) where indicated in FIGURES 1 to 3.

In FIGURE 7, this latter stage (IV) is illustrated, and comprises the removed partition ($s$) of an alcoholic extract for instance ($r$) as obtained in stage (III), between water and the aforesaid monohydroxylic alcohol already used in stage (III). This time, however, the combined aqueous extracts ($u$) of the several repeated extractions constituting stage (IV) are subjected to further treatment, possibly after combining therewith the aqueous phase ($z$) left under stage (III).

Figure 8:
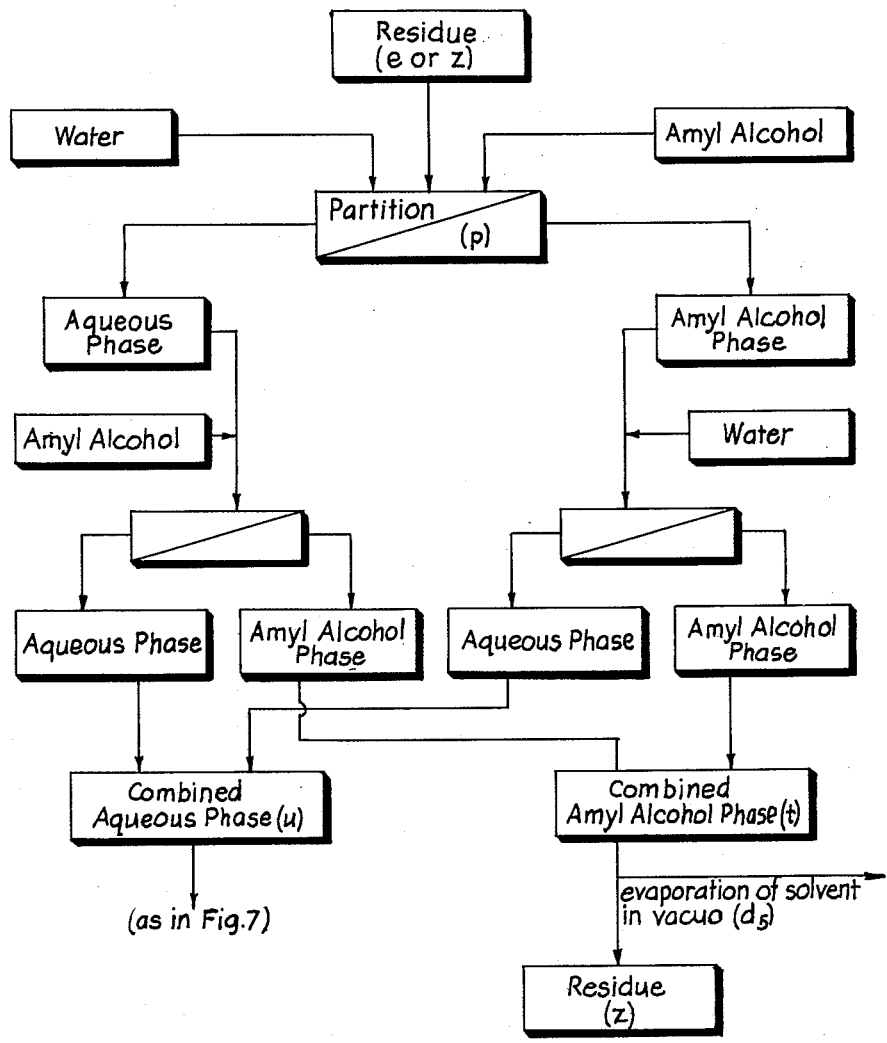
FIGURE 8 illustrates a somewhat different mode of carrying out stages (III), (IV) and (V) in combination.

In FIGURE 8, a somewhat different procedure is illustrated in which stages (III) and (IV) are combined to obtain the combined aqueous phase ($z$) and simultaneously separately the combined amyl alcohol phase ($u$) of this extraction.

The extraction steps (III) and (IV) can be carried out once or repeatedly depending on the amounts and concentrations available and the yield rate up to which the plant material is to be extracted.

Step (V) illustrated in FIGURE 7 consists in a concentration ($d_5$), where necessary of the large volume of the alcoholic phase, preferably under vacuum at temperatures not exceeding 60° C.

From the combined aqueous phase ($i$) (FIGURE 7) the solvent, water, is removed in the same manner as just stated ($d_4$) and an alkaloidal complex is obtained which has been designated as "serpajmaline" ($v$).

By threatment with a dilute solution of alkaline pH and preferably with an aqueous solution of 10% by weight of ammonia ($w$), a soluble basic and an insoluble non-basic component with a very small proportion of the basic component can be separated.

The alkaloidal complex isolated according to the present invention has the following characteristics:

The alkaloidal complex, named serpajmaline, has hypotensive action and mainly consists of the stronger bases serpentine, serpentinine, ajmaline and two unknown substances showing greenish fluorescence. Serpentine, serpentinine and ajmaline have been actually isolated from the complex with yields of approximately 5.5 and 10%, respectively. This complex is, moreover, free from reserpine and other weaker bases, and while it is more potent in its hypotensive activity than reserpine it does not have the complicating and often undesirable feature of the latter's sedative and central depressant action in the treatment of hypertension. Serpajmaline is obtained in yields as high as above 1% with up to 50% total alkaloidal content, while reserpine is only obtained by the known processes in yields of about 0.1% of the weight of the dried roots. In view of all these facts, it appears that the non-alkaloidal constituents of such complexes are not unlikely to exercise a potentiative, synergistic action along with the alkaloidal constituents of the complex. The exact nature of the complex, however, and the role of each of its alkaloidal and non-alkaloidal components in the over-all picture of its physiological action is not yet clear and will have to be a subject of long-range study and investigation.

Serpajmaline forms a light cream coloured amorphous powder, which is readily soluble in water, absolute alcohol, and moist acetone; and is insoluble in benzene, ethyl acetate, ether and other non-miscible organic solvents. It begins to soften at 85° C., sticks to the sides at about 100° C., and froths up around 130° C. On treatment with 10% ammonia it first gets sticky and then resolves into an acid soluble cream colored powder which when filtered and washed with 5% ammonia and then with water yields about 35% of a complex base on the weight of serpajmaline, the filtrate containing a further quantity about 10% of stronger bases. Its 1% aqueous solution has a pH value around 6.

The alkaloidal complex called serpajmaline may be resolved into different alkaloids with the use of extracting and purifying methods adapted to the physical and/or chemical properties of the substances.

A preferred mode of carrying out the process according to the invention as illustrated as mode (A) in FIGURE 1 of the drawings, comprises the steps of (I) repeatedly percolating fresh undried roots chopped into 2 to 3 cm. lengths with ethanol or methanol and removing the solvent from the percolates in vacuo; (II) partitioning the semi-solid residue between water and ethyl acetate; repeatedly extracting out the aqueous layer with fresh quantities of ethyl acetate whereby two clearcut fractions are obtained without leaving any insoluble residue; (III) repeatedly extracting the aqueous layer ($g$) with a hydroxylic partially water-miscible organic solvent, preferably amyl alcohol; (IV) repeatedly extracting the combined amyl alcoholic solution ($m$) with water till the aqueous extract becomes nearly devoid of color; and (V) removing the solvent ($d_5$) from the combined clear aqueous extracts in vacuo, whereby serpajmaline is obtained in the form of a light cream colored powder ($v_1$).

A further quantity of serpajmaline is recovered from the amyl alcohol phase concentrate ($r$) obtained after removal of the solvent ($d_5$) by subjecting the residue ($z$) to the series of operations (III) and (IV) (FIGURE 1) or preferably (II), (III) and (IV) (FIGURE 1A) as described above. The total serpajmaline factor thus obtained by combining the first and the second lot assays for about 40% alkaloidal content and accounts for around 40% of the total alkaloids of the percolate.

Another mode (B) of carrying out the process for isolating serpajmaline, illustrated in FIGURE 2, comprises, after stage (I), the steps of (III) partitioning the residue, left after removal of the solvent from the percolates of fresh undried chopped roots, between water and amyl alcohol and repeatedly extracting the aqueous layer with further quantities of amyl alcohol to exhaustion (IV); repeatedly extracting the amyl alcoholic extracts with water; and then removing ($d_4$) the solvent from the combined aqueous extracts ($u$) in vacuo, whereby serpajmaline is obtained as a cream colored powder. A second lot of serpajmaline is obtained by (V) removing the solvent from the amyl alcoholic solution ($r$) left after extraction with water; (II) dividing up the residue between ethyl acetate and water; extracting out the aqueous layer, along with any insoluble matter at least once, preferably repeatedly with ethyl acetate and then (III) at least once, preferably repeatedly, with amyl alcohol; extracting (IV) the combined amyl alcohol extracts ($r$) with water to exhaustion; and finally removing ($d_4$) the solvent from the aqueous extracts ($u$).

A third mode (C) of the process for isolating serpajmaline, illustrated in FIGURE 3, comprises the steps of (III) partitioning the residue, left after step (I), i.e. the removal of the solvent from the percolates of fresh undried chopped roots, between water and amyl alcohol and repeatedly extracting the aqueous layer with further quantities of amyl alcohol to exhaustion (V); removing ($d_5$) the solvent from the combined amyl alcohol extracts ($r$); (II) extracting the residue with water and ethyl acetate through simultaneous digestion with the two solvents whereby the ethyl acetate- and water-soluble fractions are obtained in two clear layers along with some insoluble matter; (III) extracting the aqueous layer ($g$) together with the insoluble matter with amyl alcohol to exhaustion; (IV) extracting out the combined amyl alcohol extracts ($r$) with water; removing the solvent from the combined aqueous extracts ($u$) in vacuo, ($d_4$) whereby serpajmaline is obtained in the form of a light cream colored powder.

A second lot of serpajmaline is obtained by (V) removing the solvent from the amyl alcohol solution ($r$) left after extraction with water, and subjecting the residue ($z$) to the series of operations (II), (III) and (IV), described above in respect of the residue ($e$) left on removal of the solvent from the alcoholic percolates.

Alkaloidal complex corresponding to serpajmaline may be similarly obtained from the other species of Rauwolfia.

The invention will be illustrated by the following non-limitative examples, the percentage yield of alkaloidal complexes being recorded on the weight of dried roots or root bark.

EXAMPLE I (a) Isolation of Serpajmaline 16 kg. (kilograms) of fresh undried roots of *Rauwolfia serpentina*, Benth., corresponding in air-dry weight to 7.65 kg., were chopped into pieces of from 2 to 3 cm. length and soaked with ethanol in a percolator for 48 hours, whereafter the first percolate was drained out. After five similar operations a sample of the percolated roots assayed for only 0.3% alkaloids as against 1.3% in the original roots on air-dry weight basis in each case. The combined percolates were completely freed of the solvent in vacuo below 60° C. The resulting 400 g. (grams) of semi-solid residue were partitioned between one liter of water and 500 ccs. of ethyl acetate whereby the whole of it was divided up between these two phases without leaving any insoluble matter. The lower aqueous layer was repeatedly extracted with ethyl acetate (4.5 liter) till the ethyl acetate layer was found to extract only a negligible quantity of the material and had a slightly yellowish color. The aqueous layer was then repeatedly extracted with amyl alcohol (in all 6 liters) till further extractions were noted to yield only negligible quantities of residue on removal of the solvent from an aliquot fraction. The combined amyl alcoholic extract was then shaken out repeatedly with water (3 liters). The aqueous extracts on removal of the solvent in vacuo below 60° C. yielded a spongy residue which could be resolved into a light cream colored powder (95 g.). The amyl alcoholic solution left after exhaustion with water was freed of the solvent and the residue was subjected to the operations carried out on the semi-solid residue left on removal of the solvent from the alcoholic percolates, whereby a second lot of serpajmaline was obtained (20 g.), making for a total yield of 115 g. (1.5%).

(b) Separation of Resajmaline and Ajmalexine

The combined ethyl acetate extracts were freed of the solvent in vacuo and digested with petroleum ether till the petroleum ether did not extract any further quantity of the resulting light cream colored powder. The petroleum ether extracts gave, on removal of the solvent, resajmaline in a yield of 53 g. (0.7%); while the light cream colored powder, ajmalexine, formed 31 g. (0.4%).

EXAMPLE II 2.26 kg. of the bark scraped from the fresh undried roots of *Rauwolfia serpentina*, Benth. (corresponding to 750 g. dry weight) were percolated 8 times in the manner described in Example I with ethanol. The combined percolates were freed of the solvent and the residue (75 g.) subjected to the operations described in Example I when it finally yielded 17.3 g. (2.3%) serpajmaline, 9 g. (1.2%) resajmaline and 6.5 g. (0.87%) ajmalexine.

EXAMPLE III

In another working the residue left after removal of the solvent from the percolates of fresh undried chopped roots was partitioned between water and amyl alcohol, and the aqueous layer was repeatedly extracted with amyl alcohol. The amyl alcohol extract was then freed of the solvent and the residue was repeatedly extracted with water and ethyl acetate through simultaneous digestion with the two solvents whereby the ethyl acetate- and water-soluble fractions were obtained in two clear layers along with some insoluble matter. The aqueous solution together with the insoluble matter was extracted to exhaustion with amyl alcohol. The amyl alcohol extracts were then extracted out with water. The combined aqueous extracts on removal of the solvent in vacuo yielded serpajmaline. The amyl alcohol solution left after extraction with water was freed of the solvent and the residue was subjected to the operations carried out on the semi-solid residue left on removal of the solvent from the alcoholic percolates, whereby a second lot of serpajmaline was obtained. The other alkaloidal complexes were obtained after the manner described in Example I. The yields from 2 kg. of fresh material (corresponding to 700 g. on dry weight basis) were 9.8 g. (1.4%) of serpajmaline, 4.8 (0.68%) of resajmaline, and 2.8 g. (0.4%) of ajmalexine.

EXAMPLE IV 20 g. of the residue left on removal of the solvent from the alcoholic extract of the fresh roots was divided up between amyl alcohol and water. The aqueous layer was repeatedly extracted with further quantities of amyl alcohol to exhaustion. The combined amyl alcohol extracts were repeatedly extracted with water. The aqueous extracts were freed of the solvent to yield the first lot of serpajmaline. The amyl alcohol fraction left after extraction with water was freed of the solvent. Working up the residue after the manner described in Example I gave a second lot of serpajmaline making a total yield of 5.7 g. (1.5%), and the other two alkaloidal complexes: resajmaline, 2.7 g. (0.7%); and ajmalexine, 16 g. (0.4%).

EXAMPLE V 1.25 kg. of freshly collected roots were dried in a current of air at about 60° C., powdered and sifted through a 30 mesh sieve. The powder (600 g.) was percolated 8 times with ethanol at room temperature. The combined percolates were freed of the solvent and the residue (60 g.) subjected to the operations described in Example I when it finally yielded 10.0 g. (1.67%) of serpajmaline, 2 g. (0.33%) of resajmaline and 1.6 g. (0.27%) of ajmalexine. In this case some quantity of a reddish brown resinous matter was left undissolved in both water and ethyl acetate which was neglected in subsequent working.

In all above-described examples the treatment was carried out at room temperature, unless stated otherwise, and the pH value of the various extracts remained unadjusted.

It will be observed from the above examples that, while the yield of serpajmaline from the roots dried under controlled conditions is about the same as from the fresh undried roots, the yields of resajmaline and ajmalexine, which will form the source material for reserpine and other weaker bases, are reduced to about half in the dried roots. In the case of roots carelessly dried, often with the development of fungus growth in the process of drying, it stands to reason that the position is further adversely affected, and the isolation procedure greatly complicated.

It will be understood that this invention is susceptible to further modification and, accordingly, it is desired to comprehend such modification within this invention as may fall within the scope of the appended claims.

This application is a continuation-in-part application of application 669,448, filed July 2, 1957, now abandoned.

What I claim is:

1. A process for the isolation of an alkaloidal complex from *Rauwolfia serpentina*, Benth., comprising
    (I) the steps of percolating a source material from said Rauwolfia plant with an alcohol selected from the group consisting of methanol and ethanol and removing the alcohol from the resulting percolate to obtain a semi-solid residue;
    (II) partitioning the resulting semi-solid residue between water and a water-immiscible organic solvent selected from the group consisting of acetates of lower alcohols with 2 to 5 carbon atoms per molecule, thereby obtaining an organic and an aqueous phase;
    (III) extracting the aqueous phase resulting from (II) at least once with a monohydric alcohol having from 4 to 6 carbon atoms per molecule;
    (IV) extracting the alcoholic phase resulting from (III) at least once with water; and
    (V) removing the water from the aqueous phase resulting from (IV) by distillation under vacuum at a temperature up to 60° C., thereby obtaining a light cream colored amorphous powder named serpajmaline and constituting a complex of alkaloids of Rauwolfia which is of greater hypotensive activity than reserpine and free from the sedative and depressant properties of the latter.

2. A process as claimed in claim 1, characterized in that the source material consists of fresh undried root parts of said Rauwolfia plant.

3. A process as claimed in claim 1, characterized in that the source material consists of parts of roots of said Rauwolfia plant, which root parts have been dried at a temperature of up to 60° C. in a current of air.

4. A process as claimed in claim 1, characterized in that the source material consists of parts of roots of said Rauwolfia plant, which root parts have been dried at a temperature of up to 60° C. in a current of an inert gas selected from the group consisting of nitrogen and carbon dioxide.

5. A process for the isolation of an alkaloidal complex from *Rauwolfia serpentina* Benth., comprising
    (I) the steps of percolating a source material from said Rauwolfia plant with ethanol and removing the alcohol from the resulting percolate to obtain a semi-solid residue;
    (II) partitioning the resulting semi-solid residue between water and ethyl acetate;
    (III) extracting the aqueous phase resulting from (II) at least once with amyl alcohol;
    (IV) extracting the alcoholic phase resulting from (III) with water; and
    (V) removing the water from the aqueous phase resulting from (IV) by distillation under vacuum at a temperature up to 60° C., thereby obtaining a light cream colored amorphous powder, named serpajmaline and constituting a complex of alkaloids of Rauwolfia which is of greater hypotensive activity than reserpine and free from the sedative and depressant properties of the latter.

6. A process as described in claim 5, further comprising the steps of (a) removing the solvent from the amyl alcohol phase resulting from (IV) and subjecting the resulting residue to the treatment, in successive order of (II), (III), (IV) and (V), thereby obtaining a further lot of serpajmaline.

7. A process as described in claim 5, characterized in that fresh undried scraped root bark is used as the source material.

8. A process as described in claim 5, characterized in that dried powdered root material is used as the source material.

9. A process as described in claim 5, further comprising the step of treating the resulting serpajmaline with dilute aqueous solution of alkaline pH, so as to obtain an acid-soluble cream colored powder being a basic component of serpajmaline.

10. A process as described in claim 5, further comprising the step of treating the resulting serpajmaline with an aqueous solution of ammonia containing 10% by weight of $NH_3$, and separating the resulting basic component of serpajmaline.

11. A process for the isolation of an alkaloidal complex from the *Rauwolfia serpentina*, Benth., comprising first the group of steps
   (A) of percolating a said Rauwolfia plant with an alcohol selected from the group consisting of methanol and ethanol and removing the alcohol from the resulting percolate in vacuo;
   (B) partitioning the residue resulting from (A) between water and a monohydric alcohol having from 4 to 6 carbon atoms per molecule;
   (C) repeatedly extracting the aqueous layer with further quantities of amyl alcohol to exhaustion;
   (D) removing the solvent from the combined amyl alcohol extracts;
   (E) extracting the resulting residue with water and ethyl acetate through simultaneous digestion with the two solvents whereby the ethyl acetate- and water-soluble fractions are obtained in two clearly separated phases along with some insoluble matter;
   (F) extracting the aqueous phase together with the insoluble matter with amyl alcohol to exhaustion;
   (G) extracting out the combined amyl alcohol extracts with water; and
   (H) removing the solvent from the aqueous extracts in vacuo at a temperature below 60° C., the pH values remaining unadjusted throughout the process, whereby serpajmaline is obtained in the form of a light cream colored powder.

12. A process as described in claim 11 further comprising the step of
   (J) removing the solvent from the amyl alcohol left after extraction with water as described in step (G); and
   (K) subjecting the resulting residue to the series of operations described in claim 11 under (B) to (H) inclusive, thereby isolating a further quantity of serpajmaline.

13. A process for producing serpajmaline, wherein a *Rauwolfit serpentina*, Benth., is extracted with methanol and said extract is dried to yield a semi-solid residue, comprising the steps of subjecting said residue to a partition extraction between water and a monohydric alcohol having 4 to 6 carbon atoms forming an aqueous phase and an alcohol phase, separating the alcohol phase, subjecting the alcohol phase to a re-extraction with water to form an alcohol phase and a serpajmaline-rich aqueous phase, and then separating said serpentina line-rich adeous phase.

14. A process for producing serpajmaline, wherein a *Rauwolfia serpentina*, Benth., is extracted with methanol and said extract is dried to yield a semi-solid residue, comprising the steps of subjecting said residue to a partition extraction between water and amyl alcohol forming an aqueous and an amyl alcohol phase, separating the alcohol phase, subjecting the alcohol phase to a re-extraction with water to form a second alcohol phase and a serpajmaline-rich aqueous phase, and then separating said serpajmaline-rich aqueous phase.

References Cited in the file of this patent

UNITED STATES PATENTS

| 2,752,351 | Schlittler | June 26, 1956 |
| 2,870,140 | Thompson et al. | Jan. 20, 1959 |

OTHER REFERENCES

Siddiqui: J. Indian Chem. Soc., vol. 8, p. 667 (1931).
Klobs: J. Am. Chem. Soc., vol. 76, pp. 1332–4 (1954).
Willaman et al.: Economic Botany, vol. 9, No. 2 (1955), pp. 142–143.
Willaman et al.: Amer. Jour. of Pharmacy, vol. 129 (1957), pp. 251–253, 225 and 256.